US008868685B2

(12) United States Patent
Bhaskaran

(10) Patent No.: US 8,868,685 B2
(45) Date of Patent: Oct. 21, 2014

(54) SYSTEM AND METHOD FOR PROVIDING AN EARLY NOTIFICATION WHEN PAGING A WIRELESS DEVICE

(75) Inventor: Hamsini Bhaskaran, San Diego, CA (US)

(73) Assignee: QUALCOMM Incorporate, San Diego, CA (US)

( * ) Notice: Subject to any disclaimer, the term of this patent is extended or adjusted under 35 U.S.C. 154(b) by 2186 days.

(21) Appl. No.: 11/353,416

(22) Filed: Feb. 13, 2006

(65) Prior Publication Data

US 2007/0192439 A1  Aug. 16, 2007

(51) Int. Cl.
*G06F 15/16* (2006.01)

(52) U.S. Cl.
USPC ........... 709/219; 709/204; 709/206; 709/224; 370/252; 370/328; 370/352; 455/90.2; 455/412.1; 455/416; 455/518

(58) Field of Classification Search
USPC ........... 709/219, 206, 204, 224; 455/90, 90.2, 455/412.1, 416, 518; 370/252, 328, 352
See application file for complete search history.

(56) References Cited

U.S. PATENT DOCUMENTS

| 6,317,600 | B1 | 11/2001 | Salonaho et al. | |
| 6,577,875 | B1 | 6/2003 | Brouwer | |
| 6,898,436 | B2 | 5/2005 | Crockett et al. | |
| 7,170,863 | B1 * | 1/2007 | Denman et al. | 370/260 |
| 7,231,223 | B2 * | 6/2007 | May et al. | 455/519 |
| 7,289,822 | B2 * | 10/2007 | Rosen et al. | 455/518 |
| 2002/0141386 | A1 * | 10/2002 | Minert et al. | 370/352 |
| 2003/0148779 | A1 | 8/2003 | Aravamudan et al. | |
| 2004/0121791 | A1 | 6/2004 | May et al. | |
| 2005/0105511 | A1 * | 5/2005 | Poikselka | 370/352 |
| 2005/0124367 | A1 * | 6/2005 | Hassan et al. | 455/518 |
| 2005/0141541 | A1 | 6/2005 | Cuny et al. | |
| 2005/0143056 | A1 | 6/2005 | Iyer et al. | |
| 2005/0164682 | A1 * | 7/2005 | Jenkins et al. | 455/412.1 |

(Continued)

FOREIGN PATENT DOCUMENTS

EP    EP1271973       1/2003
EP    1848123 A1 * 10/2007

(Continued)

OTHER PUBLICATIONS

Cao Peng et al., Performance Analysis of SIP-based Push to talk Service for GPRS/cdma2000 Network, IEEE 2004, pp. 1-4.*
International Search Report and Written Opinion—PCT/US2007/062000, International Search Authority—European Patent Office—Jun. 19, 2007 (040518).

*Primary Examiner* — Hitesh Patel
(74) *Attorney, Agent, or Firm* — Michael Taveira

(57) ABSTRACT

A system and method for a server to provide an early notification to a target group devices when paging a wireless device during a push-to-talk (PTT) communication. When a wireless device is ready to transmit a PTT communication, a message is sent from the wireless device to a server that then sends an early PING message to a base station while processing a call request message from the wireless device. After processing the call request message, the server sends an announce message to the base station. On receipt of the PING message, the base station sends a paging message to all targeted devices while processing the announce message. The early PING message causes a communication channel to be established between a targeted device and the base station, and the communication channel can then be used by the announce message with less set-up time.

12 Claims, 6 Drawing Sheets

(56) References Cited

U.S. PATENT DOCUMENTS

2006/0111134 A1* 5/2006 Mills .......................... 455/518
2007/0016828 A1* 1/2007 Luo et al. .................... 714/38
2007/0171861 A1* 7/2007 Akhtar ........................ 370/329
2008/0096597 A1* 4/2008 Vempati et al. ............. 455/518

FOREIGN PATENT DOCUMENTS

| JP | EP1732335 | 12/2006 |
| WO | WO03069944 | 8/2003 |
| WO | WO2004062306 A1 | 7/2004 |
| WO | WO2006056852 | 6/2006 |

* cited by examiner

SYSTEM AND METHOD FOR PROVIDING AN EARLY NOTIFICATION WHEN PAGING A WIRELESS DEVICE

BACKGROUND OF THE INVENTION

1. Field of the Invention

The present invention generally relates to wireless telecommunications, and more specifically, relates to a system and method for reducing the wait time at telecommunication originating wireless device during a push-to-talk (PTT) communication.

2. Description of the Related Art

Technology advancement has made mobile telephones or wireless communications devices inexpensive and accordingly ubiquitous. As wireless telecommunication devices are manufactured with greater processing ability and storage, they also become more versatile and incorporate many features including direct radio communication capability between two or a group of individual handsets. This direct radio communication capability is commonly known as the push-to-talk (PTT) or "walkie-talkie" feature that allows a user with one handset to communicate with the device of a predefined set of members of a group without dialing a destination telephone number.

In one version of a PTT system, a wireless telecommunication device, such as a wireless telephone handset, uses one single frequency for both upward and downward communications with a remote PTT server, while in a normal wireless communication a wireless telephone uses two frequencies for communicating with the PTT server, one for outgoing and one for incoming communications. In one extant form, The PTT system requires the person who is speaking to press a PTT button while talking and then release it when done. Any listener in the group can then press their button to respond. In this manner, the system determines which direction the signal travels. In a typical configuration, when a user makes a call to a receiving party or a group of receiving parties using the PTT system, the user's handset first makes a request to a remote server by informing the server it is ready to transmit. The remote PTT server verifies that no other party is using the communication channel, that the channel is available, and then assigns the channel to the user. The user's message is received by the server and the server sends the message for each and every receiving party. After the message is transmitted to every receiving party, the channel is released and ready for use by other parties.

During the process described above, usually there is a noticeable delay between the time a user presses a PTT button at his handset until the time the user is allowed to input his audio message. The delay is caused by the network and server set-up to handle and relay the communication. The server will grant the floor to the user after the targeted devices have responded and are ready to receive the audio message. Though short, the delay can be annoying; especially today when people are expecting direct telecommunications be as close to instantaneous as possible.

Therefore, it is desirous to have an apparatus and method that enables a server to quickly dispatch a response to the wireless device and the wireless device to quickly establish a PTT communication in a PTT communication system. It is to such an apparatus and method the present invention is primarily directed.

SUMMARY OF THE INVENTION

The system and method according to the invention enables a server to provide an early notification when paging a wireless device during a push-to-talk (PTT) communication. When a wireless device is ready to transmit a PTT communication, a message is sent from the wireless device to a server. The server then sends an early PING message to a base station while processing a call request message from the wireless device. After processing the call request message, the server sends an announce message to the base station. On receipt of the PING message, the base station sends a paging message to all targeted devices while processing the announce message. The early PING message causes a communication channel be established between a targeted device and the base station, and the communication channel can then be used by the announce message with less set-up time.

In one embodiment, a method is provided for reducing queuing time for an activity announcement message during a push-to-talk (PTT) communication in a wireless communication network. The method includes receiving at a server a first message invoking a PTT feature at the server from an origination device, identifying at least one targeted device for the PTT communication from the origination device, transmitting a second message with a header and an empty message body from the server to the at least one targeted device, and transmitting the activity announcement message from the server to the at least one target device. The second message is sent by the server to the at least one target device before the activity announcement message.

In another embodiment, a server is provided that is capable of handling push-to-talk (PTT) communications in a communication network, wherein the server, upon receiving a call request message for a PTT communication, identifies at least one target wireless device, transmits a testing message to the at least one target wireless device before allocating resources to the PTT communication, and transmits an announce message to the at least one target wireless device after allocating the resources to the PTT communication.

In yet another embodiment, a system is provided for reducing queuing time for an activity announcement message during a push-to-talk (PTT) communication in a wireless communication network. The system includes a server, a base station, and a user device. The server communicates with the wireless communication network and selectively transmits to a user device a plurality of messages. The base station communicates with the server and the user device and relays message therebetween. The user device is capable of communicating with the server through the base station. The server, upon receiving a call request message from the user device for a PTT communication, identifies at least one target wireless device, transmits a testing message to the at least one target wireless device before allocating resources to the PTT communication, and transmits an announce message to the at least one target wireless device after allocating the resources to the PTT communication.

The present system and methods are therefore advantageous as they enable a wireless communication device to efficiently transmit data and/or audio packets to a server during a PTT communication, thereby lessening setup delay. Other advantages and features of the present invention will become apparent after review of the hereinafter set forth Brief Description of the Drawings, Detailed Description of the Invention, and the Claims.

DETAILED DESCRIPTION OF THE INVENTION

In this description, the terms "communication device," "wireless device," "wireless communications device," "PTT communication device," "handheld device," and "handset" are used interchangeably, and the terms "channels" and "groups" are used interchangeably. The term "application" as used herein is intended to encompass executable and nonexecutable software files, raw data, aggregated data, patches, and other code segments. The term "communication channel" refers to any voice or data path in a telecommunication or computer network in digital or analog format. As used herein, the term "exemplary" only indicates that what is shown is an example, and does not indicate a preferred embodiment or otherwise indicate any degree of preference. Further, like numerals refer to like elements throughout the several views, and the articles "a" and "the" include plural references, unless otherwise specified in the description.

Figure 1:
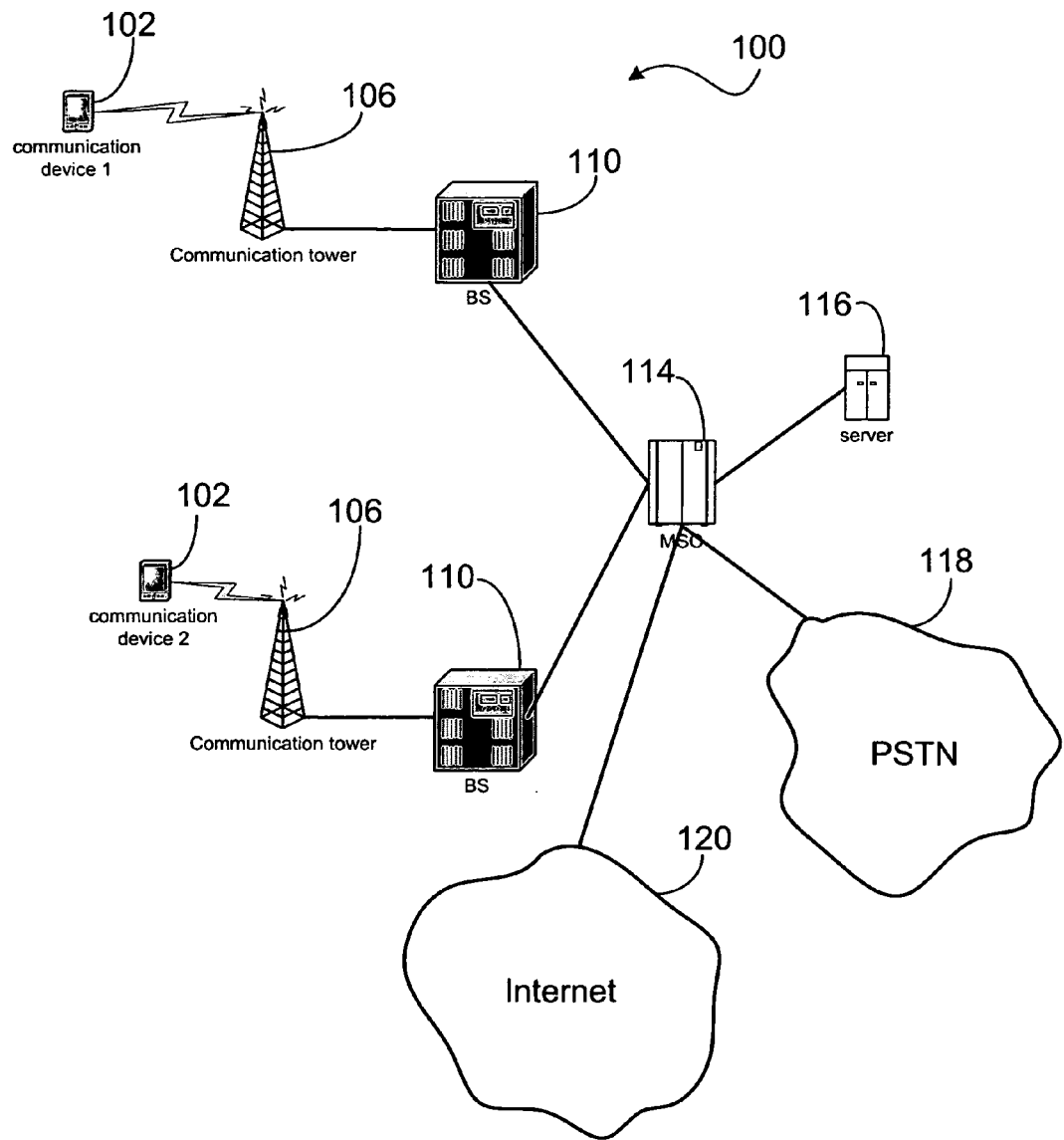
FIG. 1 depicts a prior art communication network.

In overview, a system and method according to the invention shortens the delay between the time a user presses a PTT button and the time the PTT server grants "the floor" to the user by enabling an early PING message be sent to the targeted wireless devices. FIG. 1 depicts a prior art communication network 100. The communication network 100 includes one or more communication towers 106, each connected to a base station (BS) 110 and serving users with communication device 102. The communication device 102 can be cellular telephones, pagers, personal digital assistants (PDAs), laptop computers, or other hand-held, stationary, or portable communication devices that support push-to-talk (PTT) communications. The commands and data input by each user are transmitted as digital data to a communication tower 106. The communication between a user using a communication device 102 and the communication tower 106 can be based on different technologies, such code division multiple access (CDMA), time division multiple access (TDMA), frequency division multiple access (FDMA), the global system for mobile communications (GSM), or other protocols that may be used in a wireless communications network or a data communications network.

The PTT communications are transmitted through data packets over the communication network 100. The wireless communication device 102 sends and receives audio data packets on an assigned communication channel and control data are sent and received through a data channel. The data packets from each device is sent from the communication tower 106 to a base station (BS) 110, and forwarded to a mobile switching center (MSC) 114, which may be connected to a public switched telephone network (PSTN) 118 and the Internet 120. The MSC 114 may be connected to a server 116 that supports the PTT feature in the communications network 100. Optionally, the server 116 may be part of the MSC 114. The server 116 may also suppress transmission of PTT communication to a particular wireless device upon request from the device requesting not to be contacted. The data packets are forwarded by the server 116 to the receiving wireless device 102 where an audio stream will be constructed based on the data in the data packets. In an alternative embodiment (not shown), the MSC 114 may not needed in a data-only network. The data packets are sent by the BS 110 to a packet data serving node and/or other servers for processing. The data packets are transmitted between the wireless device 102 and the BS 106 according to a predefined protocol such as Realtime Transport Protocol (RTP), Transfer Control Protocol/Internet Protocol (TCP/IP), User Datagram Protocol (UDP)/IP, or other suitable protocols.

An originating wireless device 102, when ready to engage in a PTT communication, sends a call message through the base station 110 to the server 116. The server 116 sends an announce message to the base station 110. The announce message is queued at the base station 110 until the targeted wireless device 102 is located. The base station 110 uses a page message to locate the targeted wireless device 102. After receiving a response from the targeted wireless device 102, the base station 110 delivers the announce message to the targeted wireless device 102. The targeted wireless device 102 acknowledges the announce message, and this acknowledgement message is forwarded by the base station 110 to the server 116. After confirming the targeted wireless device 102 is available, the server 116 sends a status message to the originating wireless device 102. The originating wireless device 102 can then start to transmit subsequent audio communications.

Figure 2:
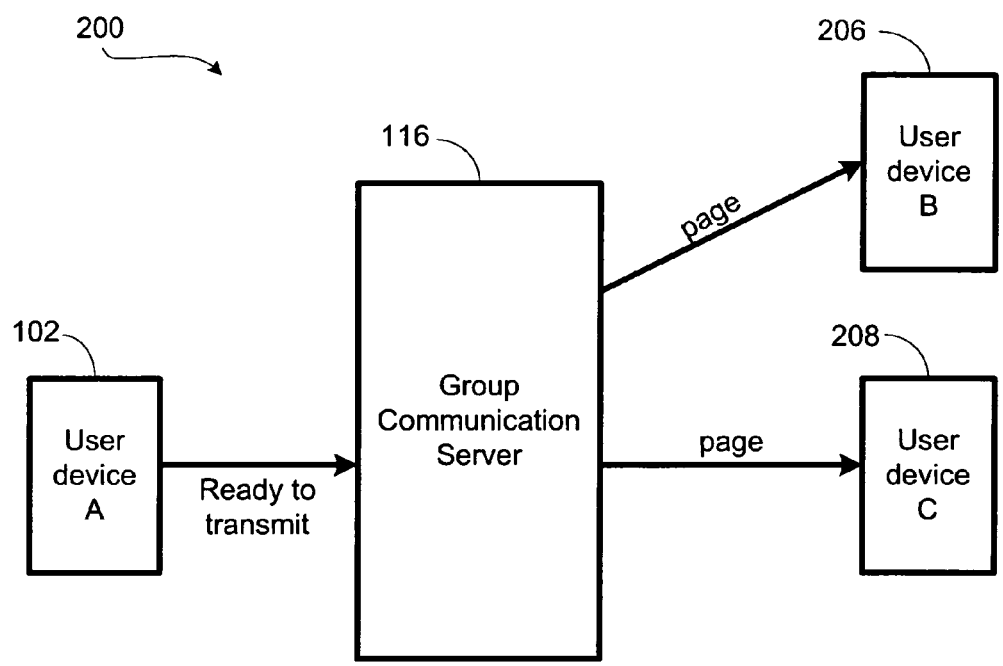
FIG. 2 is a diagram representing prior art interactions between the server and wireless devices during a set up process for a PTT communication.

FIG. 2 is a simplified diagram 200 representing interactions between the server (also known as the group communication server) 116 and wireless devices 102, 206, 208 during a PTT communication process. The base stations 110 are omitted from FIG. 2. A communication does not occur between an initiating wireless device 102 and a server 116 until a user activates the PTT feature, typically by pressing a PTT button. After the user activates the PTT feature, the wireless device 102 sends a message to the server 116 indicating it is ready to transmit a PTT message. Upon receiving the message from the wireless device 102, the server 116 determines the target wireless devices 206, 208 to which the PTT communication is directed and pages the wireless devices 206, 208.

Figure 3:
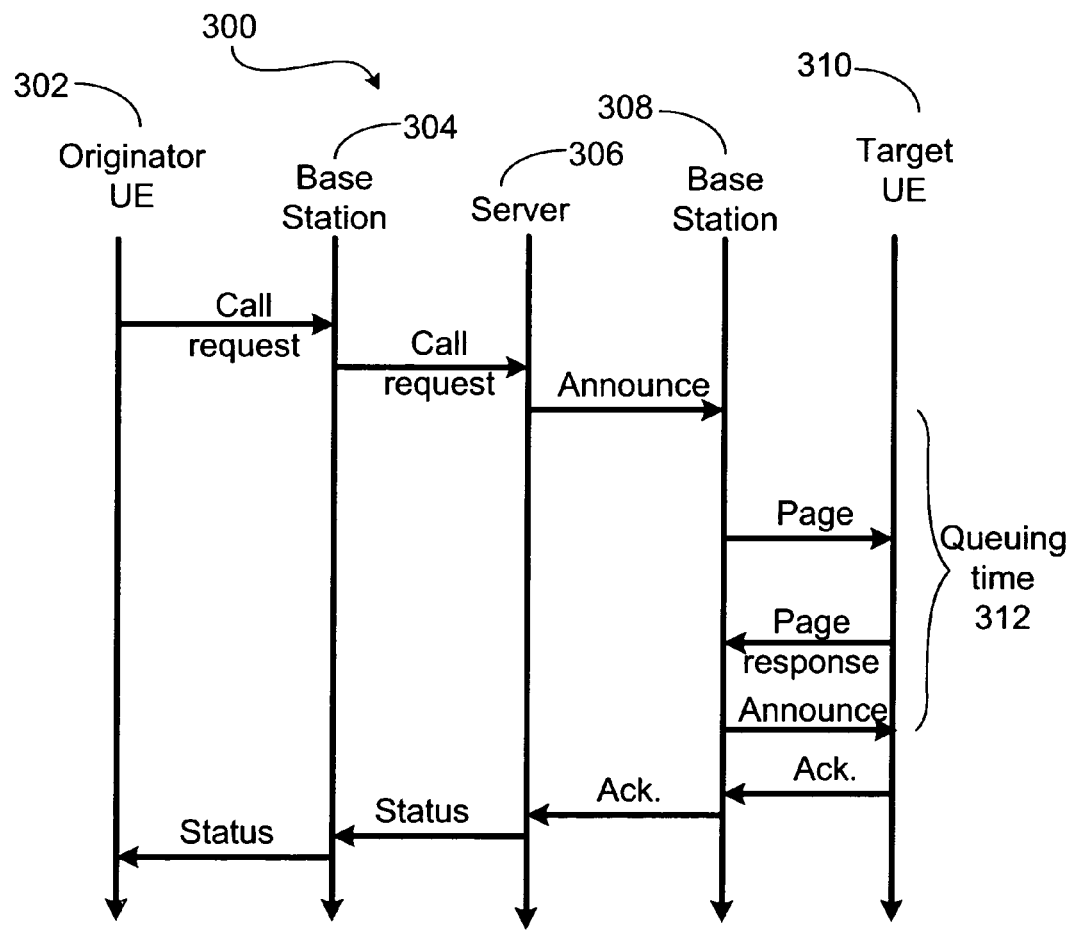
FIG. 3 is a prior art message flow between wireless devices and the server during the set up process for the PTT communication.

FIG. 3 is a prior art diagram 300 illustrating the message flow in a communication network when setting up a PTT communication. The originating wireless device (user device) 302 sends a call request message through wireless communication to the base station 304, which forwards the call request message to the server 306. When the server 306 receives a call request message, the server 306 executes a variety of tasks before sending an announce message to the target wireless devices. The server 306 identifies the target wireless device, checks for call restrictions for the target wireless device, selects a vocoder and a media host for the PTT communication, checks whether it is a group call, and allocates other related resources as necessary.

After performing all the tasks described above, the server 306 sends an announce message to the base station 308 that serves the target wireless device 310. Before delivering the announce message to the target wireless device 310, the base station 308 queues the announce message and pages the target wireless device 310. When a page response is received by the base station 308, the base station 308 sets up a data channel between the base station 308 and the target wireless device 310. After the data channel is established between the base station 308 and the target wireless device 310, the base station 308 transmits the announce message to the target wireless device 310. The target wireless device 310 sends an acknowledgment message back to the base station 308 indicating it is available for the PTT communication. The base station 308 forwards the acknowledgment message back to the server 306. After confirming the target wireless device 310 is available, the server 306 grants the "floor" to the originating wireless device 302 by sending a status message to the originating wireless device 302. The status message is received and forwarded by the base station 304 to the originating wireless device 302. After the status message is received by the originating wireless device 302, the originating wireless device 302 generates an audible indication to the user indicating the wireless device and the network are ready for the PTT communication.

The time delay from the time when the user pushes the PTT button until the audible indication is played to the user is a noticeable delay to the user and this delay is greatly dependent on the queuing time 312 the announce message is queued at the base station 308.

Figure 4:
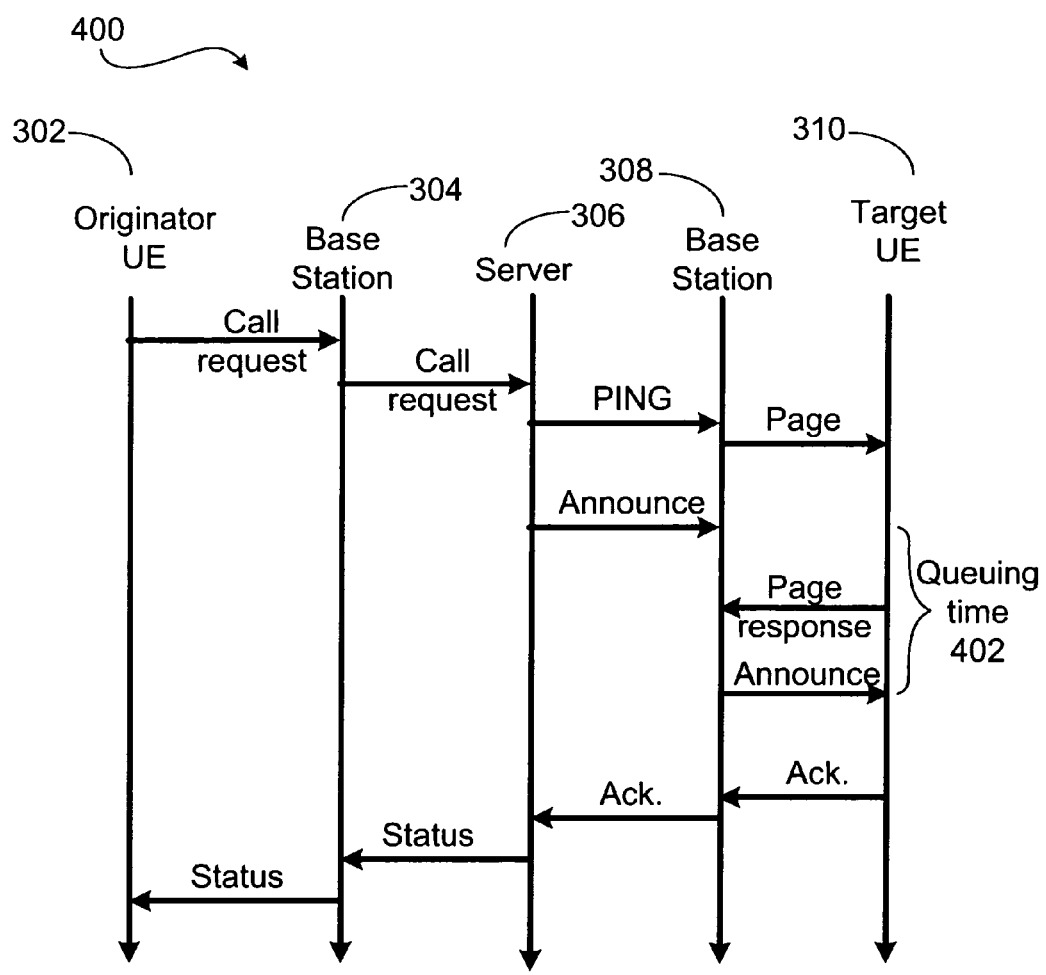
FIG. 4 is an exemplary embodiment of a message flow between wireless devices and the server during the set up process for the PTT communication.

FIG. 4 is a message flow diagram 400 where the time delay is reduced by reducing the queuing time. The originating wireless device (user device) 302 sends a call request message through wireless communication to the base station 304, which forwards the call request message to the server 306. When the server 306 receives the call request message, the server 306 first identifies the target wireless device, and then checks for call restrictions for the target wireless device. If the target wireless device does not have any call restriction, i.e., the target wireless device can receive the PTT communication can be delivered, the server 306 sends an early PING message to the target wireless device 310 before finishing other call processing related tasks, such as selection of a vocoder and a media host. The PING message is a message used to test whether a particular network destination on a network is online. If there is no return message from the network destination, then the network destination is either down or unreachable.

The PING message from the server 306 is received and queued at the base station 308. The base station 308 does not distinguish the PING message from other type of messages. The base station 308 sends a paging signal to the target wireless device 310. When the page response is received by the base station 308, the base station 308 sets up a data channel between the base station 308 and the target wireless device 310. By the time the data channel is established between the base station 308 and the target wireless device 310, an announce message would have arrived from the server 306 and queued at the base station 308. When the data channel is ready, the base station 308 transmits both the PING message and announce message to the target wireless device 310. After receiving the PING message and announce message, the target wireless device 310 sends acknowledgment messages to both messages back to the server 306. The server 306 receives the acknowledgment messages and grants the floor to the originating wireless device 302 as described above for FIG. 3.

The queuing time 402 for the announce message is greatly reduced according to the invention. Because the PING message is dispatched by the server 306 in the early stage of processing the call request message, the base station 308 can start to page the target wireless device 310 and set up the data channel independently from receiving the announce message. By overlapping the paging of the target wireless device by the base station 308 and the processing of the call request message at the server 306, the announce message will be queued for a shorter time at the base station 308.

Figure 5:
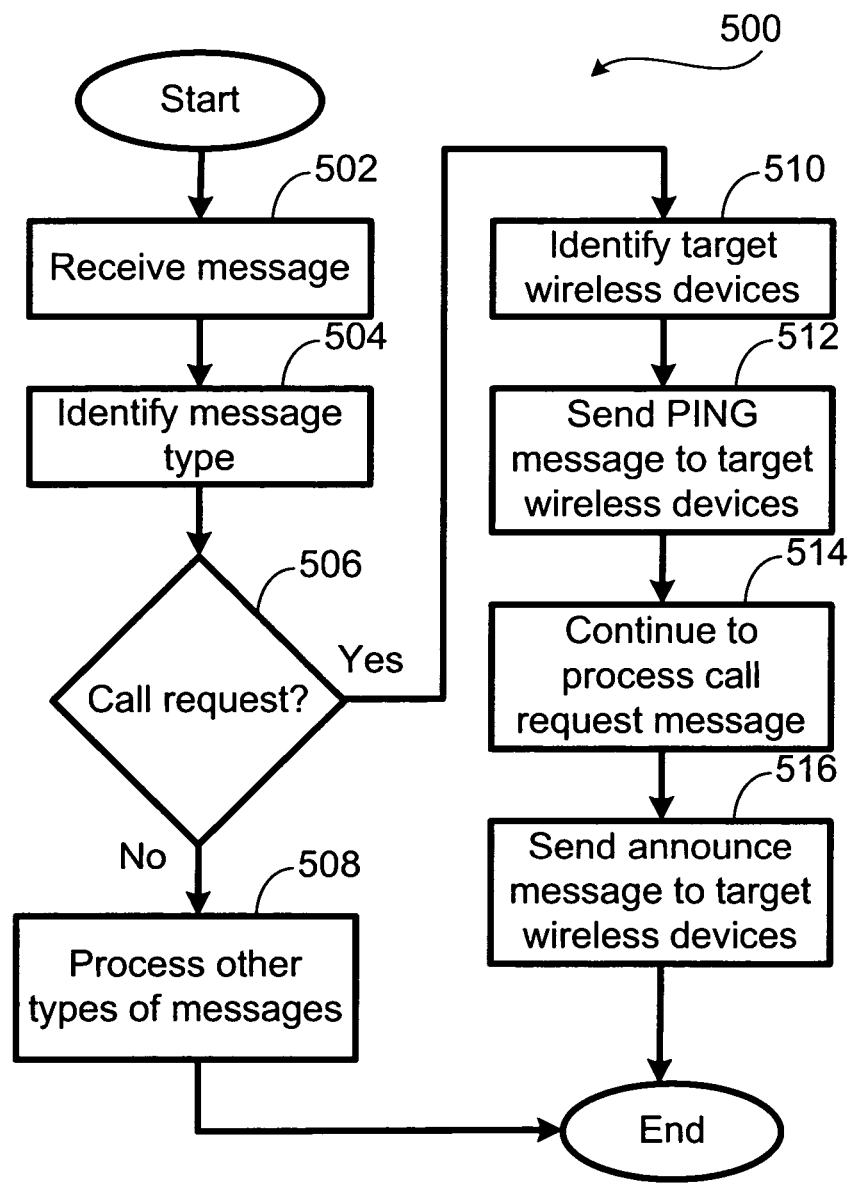
FIG. 5 is a flow chart for an exemplary embodiment of a server process.

FIG. 5 is a flow chart for a server process 500 according to the invention. The server receives messages, step 502, from different wireless devices on a communication network. When a message is received, the server checks the message type, step 504, and the server can process different types of messages, step 508. If the message received is a call request message, step 506, from a wireless device requesting a PTT communication, the server identifies target wireless devices, step 510. After identifying the target wireless devices, the server checks for call restrictions for the target wireless devices. If there is no call restriction, the server sends a PING message to each of the target wireless devices, step 512, before selecting a vocoder and a media host for the PTT communication, step 514. As part of processing the call request, the server sends an announce message to the target wireless devices, step 516. When an acknowledgment message is received from a target wireless device, the server will then send a status message back to the originating wireless device granting it the "floor" to make a PTT communication.

Figure 6:
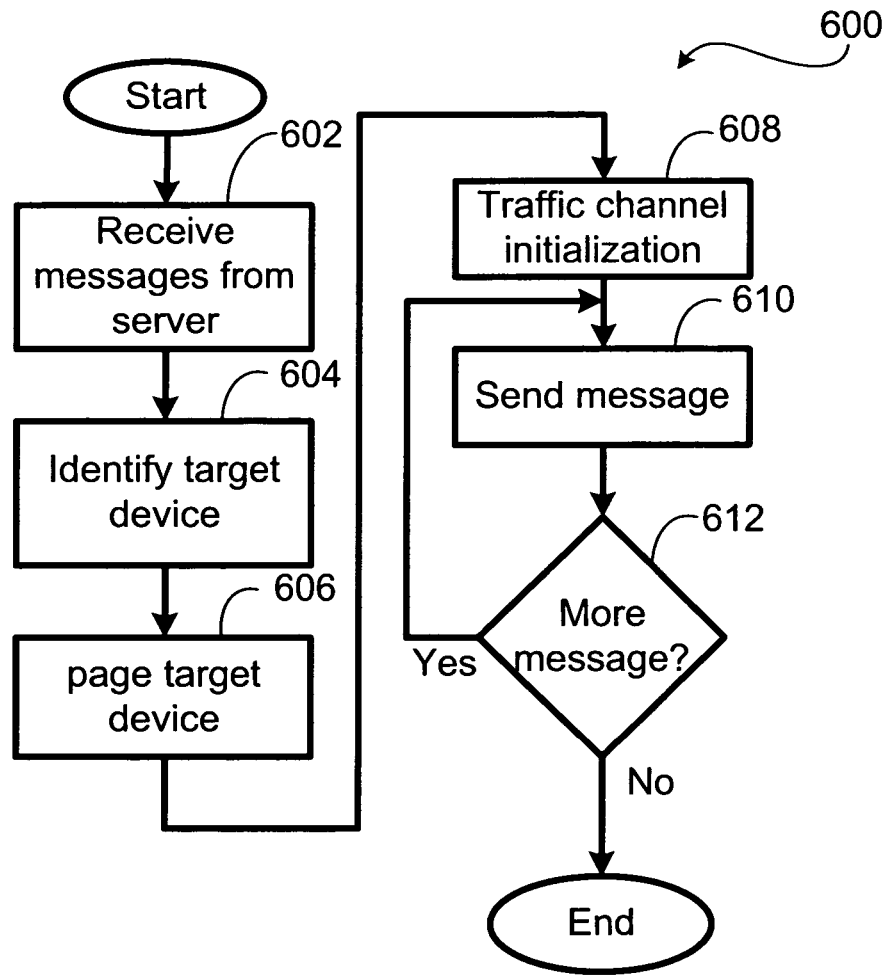
FIG. 6 is a flow chart for an exemplary embodiment of a base station process.

FIG. 6 is a flow chart for a base station process 600. The base station receives messages from a server, step 602, destined to wireless devices that are within its geographic area. The base station analyzes the message's header information and identifies a target wireless device, step 604. After identifying the target wireless device, the base station sends a paging signal to the target wireless device, step 606. If the target wireless device is powered on and in the area, it will send a paging response back to the base station (not shown). After sending the paging signal, the base station proceeds to initialize a data channel between itself and the target wireless device, step 608. After the data channel is set up, the base station sends the message to the target wireless device, step 610. The base station will send all the messages destined to the target wireless device, step 612, while the data channel is set. When the base station receives acknowledgment messages from the target wireless device, the base station forwards them to the server (not shown).

In view of the method being executable on a wireless service provider's computer device or a wireless communications device, the method can be performed by a program resident in a computer readable medium, where the program directs a server or other computer device having a computer platform to perform the steps of the method. The computer readable medium can be the memory of the server, or can be in a connective database. Further, the computer readable medium can be in a secondary storage media that is loadable onto a wireless communications device computer platform, such as a magnetic disk or tape, optical disk, hard disk, flash memory, or other storage media as is known in the art.

In the context of FIGS. 5-6, the steps illustrated do not require or imply any particular order of actions. The actions may be executed in sequence or in parallel. The method may be implemented, for example, by operating portion(s) of the wireless network, such as a wireless communications device or the server, to execute a sequence of machine-readable instructions. The instructions can reside in various types of signal-bearing or data storage primary, secondary, or tertiary media. The media may comprise, for example, RAM (not shown) accessible by, or residing within, the components of the wireless network. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the invention has been particularly shown and described with reference to a preferred embodiment thereof, it will be understood by those skilled in the art that various changes in form and detail may be made without departing from the spirit and scope of the present invention as set forth in the following claims. Furthermore, although elements of the invention may be described or claimed in the singular, the plural is contemplated unless limitation to the singular is explicitly stated.

What is claimed is:

1. A method for reducing delay in being granted a floor due to queuing time for an announce message during a push-to-talk (PTT) communication in a wireless communication network, comprising:
    receiving at a server a first message from an originating wireless device, the first message is a call request message;
    identifying at least one target wireless device for the PTT communication in response to receiving the first message;
    transmitting a second message, in response to receiving the first message, from the server to a base station to determine if the at least one target wireless device is online, the second message having a header with an empty message body and being transmitted before the announce message is sent by the server to the base station;
    allocating resources by the server to the originating wireless device;
    transmitting the announce message from the server to the base station in response to receiving the first message and after transmitting the second message, but before receiving an acknowledgement receipt of the second message;
    receiving at the server, after transmitting the announce message, acknowledgement messages acknowledging receipt of the second message and the announce message from the at least one target wireless device; and
    transmitting, after receiving the acknowledgment messages, a status message to the originating wireless device granting the floor to the originating wireless device to enable transmission of an audio message to the at least one target wireless device.

2. The method of claim 1, wherein the step of allocating resources further comprises steps of:
    selecting a vocoder for the PTT communication;
    selecting a media hosting device for the PTT communication; and
    checking for call restrictions for the at least one target wireless device.

3. The method of claim 1, wherein the second message is a PING message.

4. A server capable of handling push-to-talk (PTT) communications in a communication network, comprising:
    a processor configured with software instructions such that the processor performs operations comprising:
        receiving a call request message from an originating wireless device for a PTT communication;
        identifying at least one target wireless device in response to receiving the call request message;
        transmitting a testing message to a base station in response to receiving the call request message to determine if the at least one target wireless device is online before allocating resources to the PTT communication;
        allocating resources to the at least one target wireless device;
        transmitting the announce message to the base station in response to receiving the call request message and after allocating the resources to the PTT communication after transmitting the testing message, but before receiving an acknowledgement receipt of the testing message;
        receiving at the server, after transmitting the announce message, acknowledgement messages acknowledging receipt of the testing message and the announce message from the at least one target wireless device; and
        transmitting, after receiving the acknowledgment messages, a status message to the originating wireless device granting a floor to the originating wireless device to enable transmission of an audio message to the at least one target wireless device.

5. The server of claim 4, wherein the processor is configured with software instructions to perform operations further comprising:
    checking call limitations for the at least one target wireless device before transmitting the testing message to the base station.

6. The server of claim 4, wherein the processor is configured with software instructions to perform operations further comprising:
    selecting a vocoder and a media host for the PTT communication after transmitting the testing message to the base station.

7. A non-transitory computer-readable storage medium having stored thereon computer-executable instructions configured to cause a processor of a server to perform operations for reducing delay in being granted a floor due to queuing time for an announce message during a push-to-talk (PTT) communication in a wireless communication network, wherein the stored processor-executable instructions are configured to cause a processor of a server to perform operations comprising:
    receiving at the server a first message from an originating wireless device, wherein the first message is a call request message;
    invoking the PTT feature at the server in response to receiving the first message;
    identifying at least one target wireless device for the PTT communication in response to receiving the first message;
    transmitting a second message, in response to receiving the first message, from the server to a base station to determine if the at least one target wireless device is online, the second message having a header with an empty message body and being transmitted before the announce message is sent by the server to the base station;
    allocating resources by the server to the originating wireless device;
    transmitting the announce message from the server to the base station in response to receiving the first message and after transmitting the second message, but before receiving an acknowledgement receipt of the second message;
    receiving at the server, after transmitting the announce message, acknowledgement messages acknowledging receipt of the second message and the announce message from the at least one target wireless device; and
    transmitting, after receiving the acknowledgment messages, a status message to the originating wireless device granting the floor to the originating wireless device to enable transmission of an audio message to the at least one target wireless device.

8. The non-transitory computer-readable storage medium of claim 7, wherein the stored processor-executable instructions are configured to cause a processor of the server to perform operations such that allocating resources by the server to the originating wireless device comprises:
  selecting a vocoder for the PTT communication;
  selecting a media hosting device for the PTT communication; and
  checking for call restrictions for the at least one target wireless device.

9. The non-transitory computer-readable storage medium of claim 7, wherein the second message is a PING message.

10. A system for reducing delay in being granted a floor due to queuing time for an announce message during a push-to-talk (PTT) communication in a wireless communication network, comprising:
  an originating wireless device;
  at least one target wireless device;
  a base station in communication with the at least one target wireless device;
  a server in communication with the originating wireless device, the at least one target wireless device, and the base station through the wireless communication network, the server selectively transmitting to the at least one target wireless device a plurality of messages,
  wherein the server comprises a processor configured with software instructions such that the processor performs operations comprising:
    receiving a call request message from the originating wireless device for a PTT communication;
    identifying the at least one target wireless device in response to receiving the call request message;
    transmitting a testing message, in response to receiving the call request message, to the base station to determine that the at least one target wireless device is online before the server allocates resources to the PTT communication, the testing message having a header with an empty message body and being transmitted before the announce message is sent by the server to the base station;
    allocating resources by the server to the originating wireless device;
    transmitting the announce message to the base station in response to receiving the call request message and after allocating the resources to the PTT communication after transmitting the testing message, but before receiving an acknowledgement receipt of the testing message;
    receiving, after transmitting the announce message, acknowledgement messages acknowledging receipt of the testing message and the announce message from the at least one target wireless device, and
    transmitting, after receiving the acknowledgment messages, a status message to the originating wireless device granting the floor to the originating wireless device to enable transmission of an audio message to the at least one target wireless device.

11. The system of claim 10, wherein the processor is configured with software instructions to perform operations further comprising:
  checking call limitations for the least one target wireless device before transmitting the testing message to the base station.

12. The system of claim 10, wherein the processor is configured with software instructions to perform operations further comprising:
  selecting a vocoder and a media host for the PTT communication after transmitting the testing message to the base station.

* * * * *